United States Patent [19]

Laska

[11] 4,286,868

[45] * Sep. 1, 1981

[54] PHOTOGRAPHIC PRINTER WITH AUTOMATIC SENSOR CALIBRATION

[75] Inventor: Ronald C. Laska, Minnetonka, Minn.

[73] Assignee: Pako Corporation, Minneapolis, Minn.

[*] Notice: The portion of the term of this patent subsequent to Oct. 30, 1996, has been disclaimed.

[21] Appl. No.: 89,547

[22] Filed: Oct. 29, 1979

Related U.S. Application Data

[62] Division of Ser. No. 862,733, Dec. 21, 1977, Pat. No. 4,172,659.

[51] Int. Cl.³ ............................................. G03B 27/80
[52] U.S. Cl. ....................................... 355/68; 355/77; 355/83
[58] Field of Search ...................... 355/38, 68, 77, 83; 356/404, 443, 444; 364/571, 525, 526; 250/214 C, 252, 562, 202

[56] References Cited

U.S. PATENT DOCUMENTS

| | | | |
|---|---|---|---|
| 3,506,352 | 4/1970 | Denner | 355/68 |
| 3,696,331 | 2/1972 | Lord | 364/571 |
| 3,873,201 | 3/1975 | Amano | 355/38 X |
| 3,891,317 | 6/1976 | Walker | 355/38 X |
| 3,986,776 | 10/1976 | George | 356/97 X |
| 4,079,257 | 3/1978 | Jatteau et al. | 250/252 X |
| 4,172,659 | 10/1979 | Laska | 355/68 |

Primary Examiner—L. T. Hix
Assistant Examiner—W. J. Brady
Attorney, Agent, or Firm—Kinney, Lange, Braddock, Westman and Fairbairn

[57] ABSTRACT

A photographic printer includes light sensors for measuring optical characteristics of photographic film to be printed. Prior to printing, the output signals of the light sensors are monitored under one or more reference condition, and calibration values based upon this monitoring are derived and stored. During normal operation of the photographic printer the sensors provide measurements of the optical characteristics of the film, and the output signals of the light sensors are calibrated based upon the stored calibration values. The exposures are then controlled as a function of the corrected output signals.

5 Claims, 6 Drawing Figures

Photographic Printer with Automatic Sensor Calibration

This is a division of application Ser. No. 862,733, filed Dec. 21, 1977, now U.S. Pat. No. 4,172,659.

BACKGROUND OF THE INVENTION

The present invention relates to photographic printing systems. In particular, the present invention is a method and apparatus for correcting the output signals of light sensors used to measure optical characteristics of photographic film to be printed.

Photographic printers produce color or black and white prints or transparencies from photographic film originals (generally negatives). High intensity light is passed through the film and imaged on the photosensitive print medium (film or paper). The photographic emulsion layer on the print paper or film is exposed and subsequently processed to produce a print or transparency of the scene contained in the original.

Automatic photographic printers often include an automatic density correction (ADC), or color or density scanning mechanism, which scans the negative prior to printing and provides measurements of the transmission density of the negative at defined discrete or continuous areas, as opposed to an average or integrated measurement over the entire negative. The measurements of the negative so derived can be used as the sole means of exposure determination, or in conjunction with other measurements to calculate the proper exposure. Many of the scanning systems have included moving optical elements to provide the desired scanning, while other scanning systems may have used fixed sensors which view different portions of the negative. A system having fixed sensors rather than moving optical elements is generally desirable from a cost, size, and reliability standpoint.

SUMMARY OF THE INVENTION

The present invention is based upon the recognition that in photographic printers using a plurality of light sensors to measure an optical characteristic of the photographic film (such as an ADC or color or density scanning station), variations in the output signals caused by factors other than the film itself can lead to erroneous control of exposure time. In particular, variations in light intensity due to a non-uniform light source or variation in transmission of the optical path, sensitivity variations of the sensors, and gain variations throughout the electrical system which processes the signals of the sensors can cause the output signals to vary significantly from one another.

The present invention provides automatic calibration or correction of the output signals of the light sensing system of a photographic printer. The output signals are monitored under one or more reference condition, and calibration values based upon this monitoring are derived and stored. These calibration values are used during normal operation of the photographic printer to calibrate the output signals. Exposures may then be controlled as a function of the corrected output signals.

DETAILED DESCRIPTION OF THE PREFERRED EMBODIMENT

Figure 1:
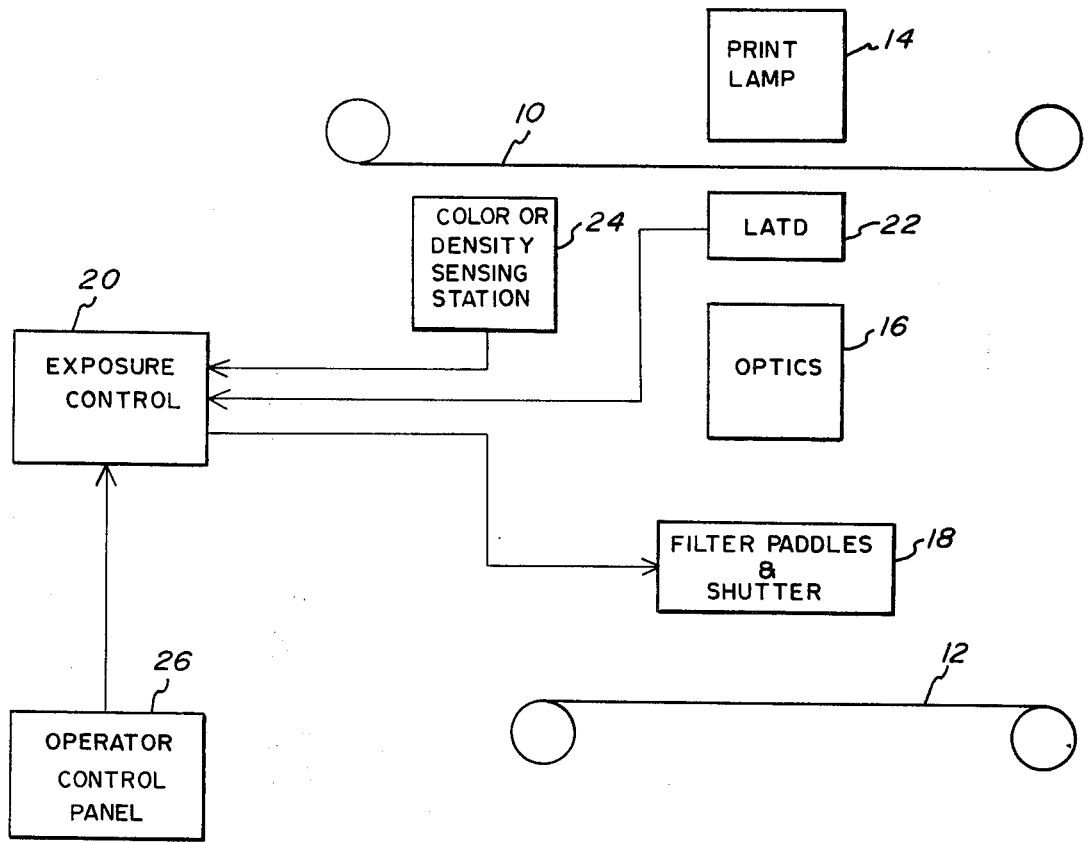
FIG. 1 is a system block diagram of a photographic printer.

FIG. 1 is a block diagram illustrating a photographic printer. In the printer, an image contained in film 10 is printed onto photosensitive paper 12. Light from print lamp 14 is passed through a frame of the film 10 and is focused by the optics 16 onto an appropriate portion of paper 12.

The exposure time during which paper 12 is exposed to the image from film 10 is determined by the position of filter paddles and shutter 18. The filter paddles typically include a subtractive filter for each color channel (red, green, and blue). Filter paddles and shutter 18 are controlled by exposure control 20.

In the embodiment shown in FIG. 1, exposure control 20 receives input signals from large area transmission density (LATD) sensors 22, from density or color sensor station 24, and from operator control panel 26. Not all of these sources of input signals are required in every system, and, similarly, other sources of input signals which affect the exposures may be used in the printer. For example, when sensor station 24 is a color sensing system, LATD sensors 22 may not be required.

Figure 2:
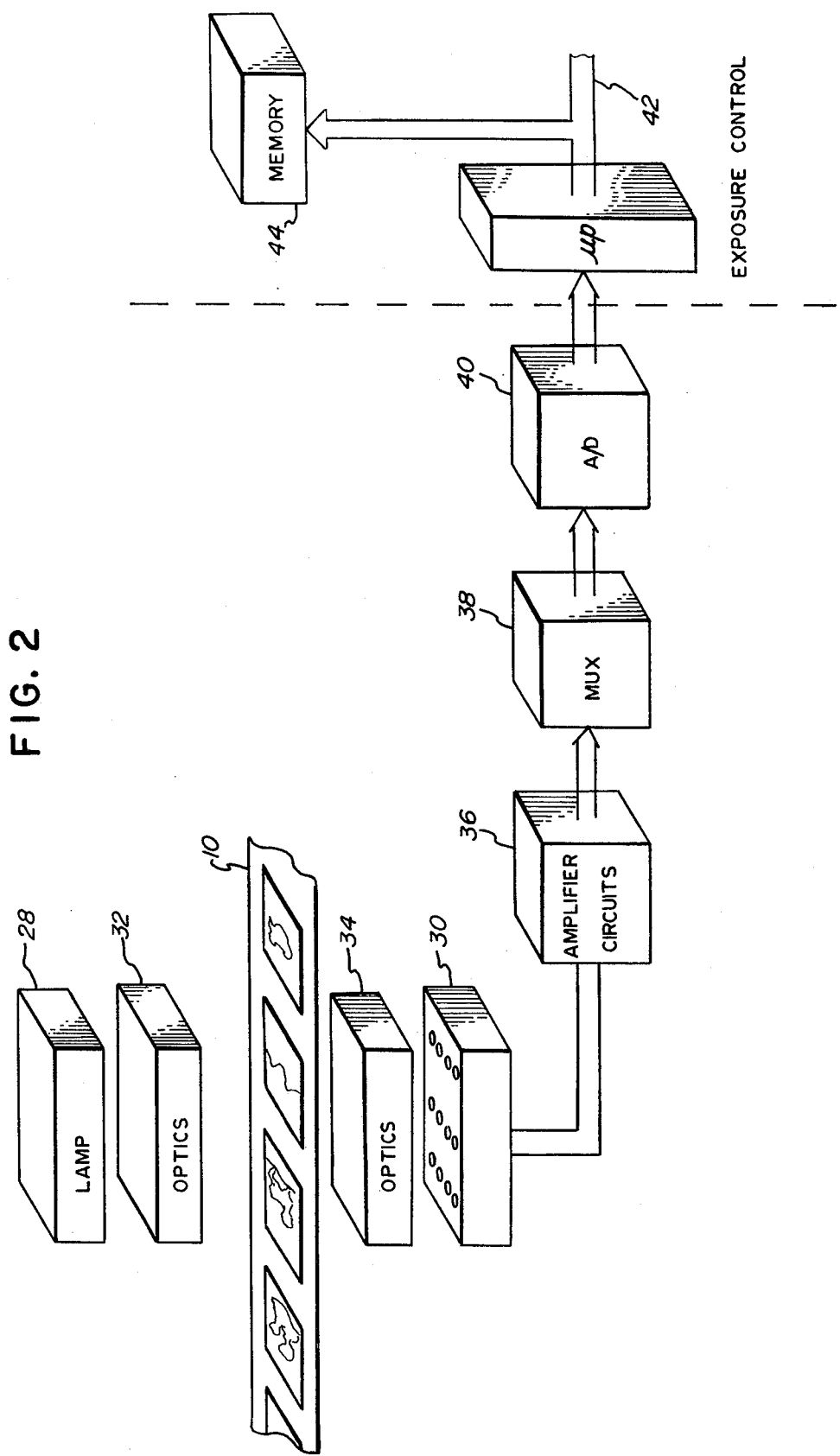
FIG. 2 is a block diagram of a portion of a photographic printer including an automatic density correction scanning station using an array of light sensors.

FIG. 2 illustrates the color or density sensor station of FIG. 1, and a portion of the exposure control. In the embodiment shown in FIG. 2, the sensor station includes a lamp 28 which supplies light through film 10 to sensor array 30. Lamp 28 may be a separate lamp or may be the same lamp (i.e. print lamp 14) which supplies light for printing. Sensor array 30 preferably is an array of photovoltaic sensors such as silicon sensors which view different portions of the negative positioned under lamp 28. Optional optics 32 and 34 may be interposed between lamp 28 and film 10 and between film 10 and sensor array 30, respectively, to distribute and direct the light from lamp 28, through film 10, and to individual sensors of array 30.

The output signals of each of the sensors of array 30 are supplied to amplifier circuits 36 where the signals are amplified. The amplified output signals are then multiplexed by multiplexer 38 and supplied to A/D converter 40, which converts the analog output signals to digital signals. The digital signals from A/D converter 40 are supplied to a digital processor such as microprocessor 42 of exposure control 20. Also shown in FIG. 2 is memory 44, which is associated with microprocessor 42 and may include both read only memory and read/write memory storage. Other portions of exposure control 20 are not shown in FIG. 2 because they are not critical to the description of the present invention.

It should be noted that other configurations of the signal processing circuitry may be used with the present invention. For example, the order in which amplification, multiplexing, and A/D conversion occur may differ from the specific arrangement shown in FIG. 1.

Figure 3:
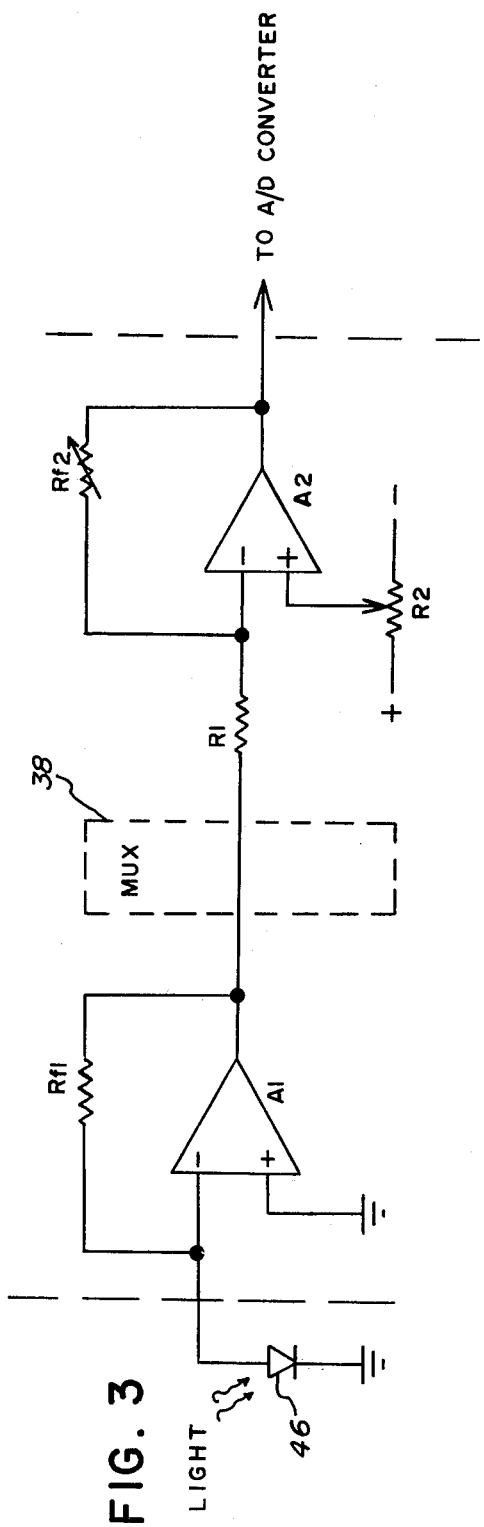
FIG. 3 is an electrical schematic diagram of a light sensor and an amplifying circuit associated with that light sensor.

FIG. 3 illustrates a typical light sensor 46 of array 30 together with its amplifying circuit which forms a part of amplifier circuits 36. In one embodiment of the present invention, each individual sensor of array 30 has a separate amplifier circuit similar to that shown in FIG. 3.

As illustrated in FIG. 3, sensor 46 is a photovoltaic sensor running at zero bias. The cathode of photovoltaic sensor 46 is connected to ground, and the anode is connected to the inverting input of amplifier A1. The noninverting input of A1 is connected to ground, and a feed back resistor $R_{f1}$ is connected between the output of A1 and the inverting input. This forms a current amplifier, and the voltage output of the amplifier-diode combination is equal to the diode current times the feedback resistor value. Since the noninverting input of A1 is at ground, the inverting input is a virtual ground and there is no voltage impressed across photovoltaic sensor 46. Problems with dark current from sensor 46, therefore, are eliminated.

After the initial current amplification by A1, a second amplifier stage is provided by resistors R1, R2, $R_{f2}$, and amplifier A2. This amplification stage is physically located near A/D converter 40, and it is used to provide the voltage levels required for proper operation of A/D converter 40. In addition, resistors R2 and $R_{f2}$ provide some coarse calibrations with gain and offset adjustments so that the output signals can be balanced to some extent electrically to constrain the output signals to the range required by A/D converter 40 over the range of sensor illumination.

One difficulty with any system of the type illustrated in FIGS. 2 and 3 is that the output signals supplied to A/D converter 40, and therefore ultimately to microprocessor 42, can differ as a result of factors totally unrelated to the optical characteristics of the negative being viewed. First, the light intensity from lamp 28 and optics 32 may not be absolutely uniform, so that variations in the signals from sensor array 30 can occur due to differences in light intensity reaching the individual sensors. Second, any optics 34 introduced between film 10 and sensor 30 may exhibit non-uniformity. Third, the individual sensors typically vary somewhat in sensitivity. Fourth, gain variation throughout the system can also occur due to differences in the tolerances of the amplifiers and resistors. Fifth, since analog signals are being processed, some drift can occur over time which can also lead to erroneous signals being supplied to microprocessor 42.

Although the electrical adjustments possible with R2 and $R_{f2}$ for each amplifier circuit provide a means of correcting these variations between sensors, there are disadvantages to using these adjustments as the sole means of providing a calibrated output. In particular, they require precise electrical adjustments by a trained service technician. This type of calibration is time-consuming and expensive, and should be avoided after initial installation of the printer. Additionally, should the same sensors be required to measure densities of different size film types, separate optics assemblies 34 may be used, each with different characteristics, requiring a readjustment with each configuration change.

The present invention provides a simple and effective technique for automatically calibrating the output signals from sensor array 30. No electrical adjustments are required; the person performing the calibration does not have to be a trained service technician; and the calibration procedure takes very little time so that it can be performed whenever the operator feels it is necessary without undue sacrifice of production time.

The method of the present invention utilizes the computational power of microprocessor 42 to automatically calibrate the output signals from the various sensors of array 30. Prior to normal operation of the printer, the output signals from sensor array 30 are monitored under one or more reference conditions and calibration values are calculated by microprocessor 42 and stored in memory 44. When normal operation is commenced, microprocessor 42 uses the stored calibration values to correct the output signals received. The corrected output signals are then used by microprocessor 42 in the exposure control function.

In a preferred embodiment of the present invention, the operator covers array 30 to block all light from reaching array 30. The output signals under this first reference condition indicate the offset of the amplifier circuits from zero. The second reference condition is achieved by inserting a filter of essentially uniform attenuation (typically unexposed, processed film) between lamp 28 and sensor array 30. This provides a second set of data points from which the output signals of the sensors can be characterized.

Figure 4:
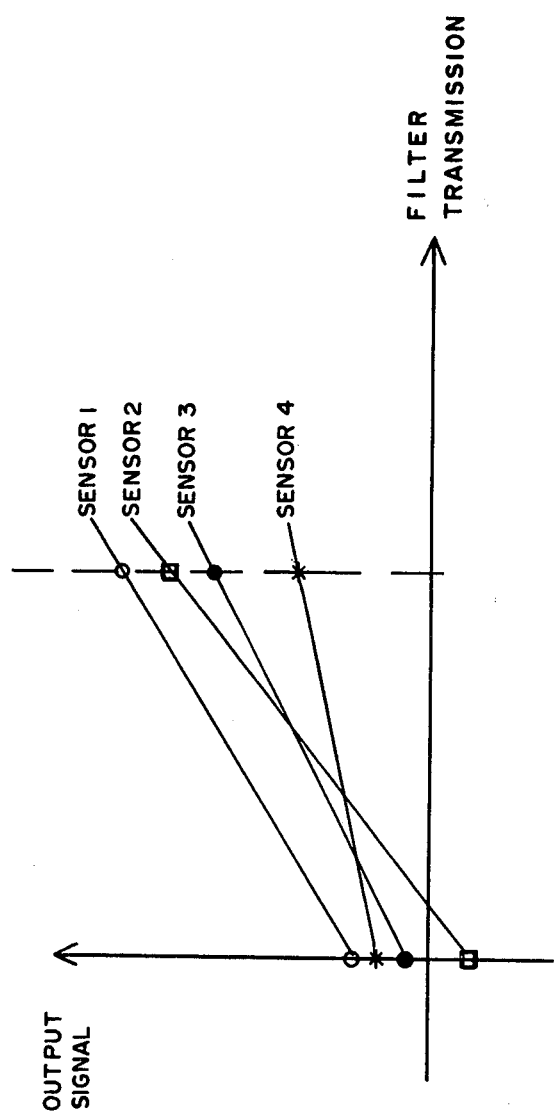
FIG. 4 illustrates output signal curves for four sensors of a typical sensor array.

FIG. 4 illustrates an example of possible output signals under the two reference conditions which are then used to calculate calibration values for the various sensors. Four representative output signals curves are shown, but of course the total number of curves depends upon the number of sensors in the system. In FIG. 4, filter transmission is plotted along the x-axis and output signal is plotted along the y-axis. From the two data points for each sensor, it is possible to characterize the output curves from those sensors by the equation $y = A_n x + B_n$, where n is the integer corresponding to the particular sensor. The slope of the curve represents the overall system gain factor $A_n$, while offset $B_n$ corresponds to the y-intercept measured when all light to the sensors is blocked.

In one preferred embodiment of the present invention, the parameter of interest is the density of the exposed photographic film above that of film base (i.e. unexposed, processed film). In this embodiment, the second reference condition is achieved by inserting unexposed, processed film between lamp 28 and sensor array 30 to provide the second set of data points which represent the sensor outputs due to the unexposed film base. The density of the exposed emulsion of the photographic film, as measured by one of the sensors of array 30, is derived from the ratio of the output signal from that sensor during the second reference condition to the corresponding output signal from the same sensor when viewing the exposed film, after both signals have been corrected for offset.

In this embodiment, the output signals received during the first reference condition are stored for use in making the offset correction. The output signals received during the second reference condition are either corrected for offset and then stored, or are stored in an uncorrected state. During normal operation, a sensor output signal is received by microprocessor 42 from A/D converter 40. Microprocessor 42 subtracts the offset value $B_n$ stored in memory 44 for the corresponding sensor and then calculates the ratio of the offset-corrected sensor output signal to the offset-corrected second reference value. The resulting ratio may be termed a "corrected output signal" which may be used to control exposure.

If the absolute value of the density is required rather than the ratio of exposed film to film base, other procedures may be utilized. The second reference condition may be produced by measuring sensor outputs with no filter in the light path. During normal operation, the density of the film is determined by a similar technique to the method just described.

Alternatively, the output signals from each sensor under the first and second reference conditions may be used to derive gain and offset calibration values for each sensor, which are then stored in memory 44. If the second reference condition is a known attenuation so that the desired sensor output signal value for the second reference condition is known, the sensors are calibrated to read this value properly. If the desired sensor value for the second reference condition is unknown, the gain calibration value for each sensor may be determined by selecting one sensor (for example, sensor 1) and normalizing the gain factors of the other sensors to that sensor. In this latter case, the gain calibration multiplier for sensor n is $A_1/A_n$.

In some cases, the first reference condition (i.e. dark) may be eliminated and only the second reference condition is used in deriving calibration values. This is possible when the output signal processing electronics yield an offset value ($B_n$) that is sufficiently smaller than the smallest signal to be resolved. Alternatively, the offset may be adjusted to zero, or to a known value by the offset adjust resistor R2. This, of course, requires that drift of the offset value be kept small compared to the lowest measured signal.

The automatic calibration of the present invention should be performed at the time of installation of the printer and then at regular intervals to compensate for electronics drift, positional drift or deterioration in the optics, or light level changes due to lamp aging. In addition, the calibration procedure should be performed whenever lamp 28 is changed. For accuracy of the sensor readings, a regulated DC lamp supply should be used to avoid signal deviation which may occur if an AC lamp supply is used. Alternatively, if an AC lamp supply is used, the time constant of the electronics system (amplifiers 32) should be long enough to integrate the light from one or more cycles of the lamp supply to remove the AC signal, or a reference cell which directly senses lamp light should be used in a differential mode with the sensor array 30.

In one preferred embodiment of the present invention, the printer includes a display which displays instructions to the operator when the sensor calibration mode is selected. The operator merely follows the steps as they are displayed on the display; no electrical adjustments are required by the operator. The procedure merely requires the operator to insert the proper filter or opaque material in front of the sensors upon instruction by the machine. The machine can also check the signal levels for values within reasonable ranges to reduce the possibility of operator error, or system failure (lamp, amplifier, etc.).

Figure 5:
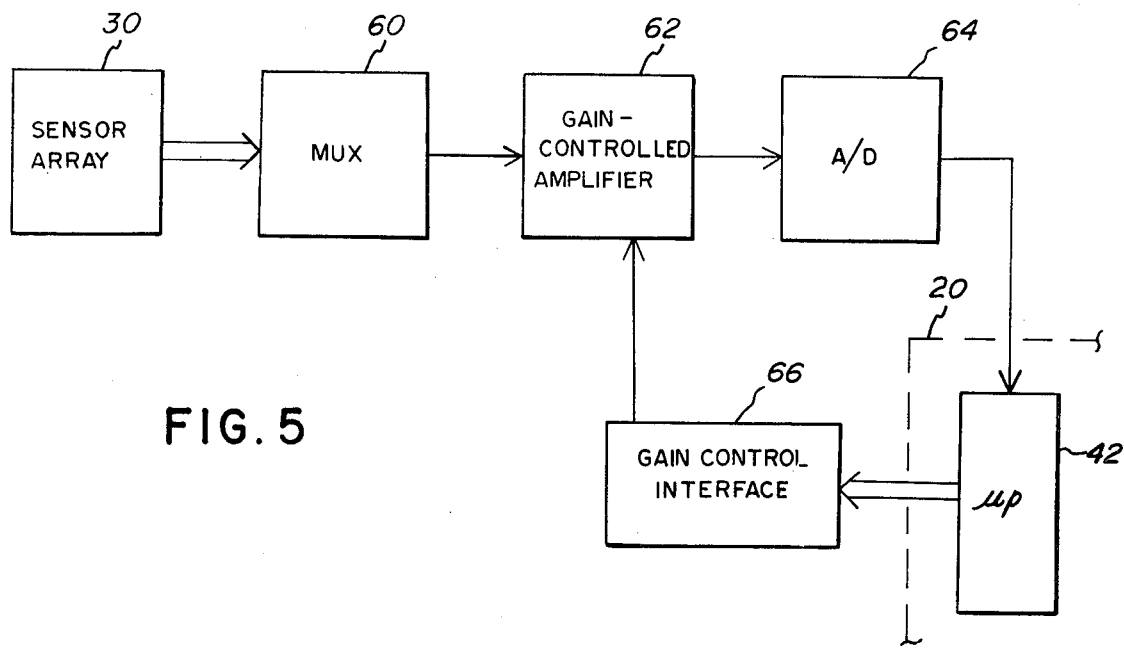
FIGS. 5 and 6 show additional embodiments of the present invention in which corrections to the output signals are made under microprocessor control in the signal processing circuitry.
Figure 6:
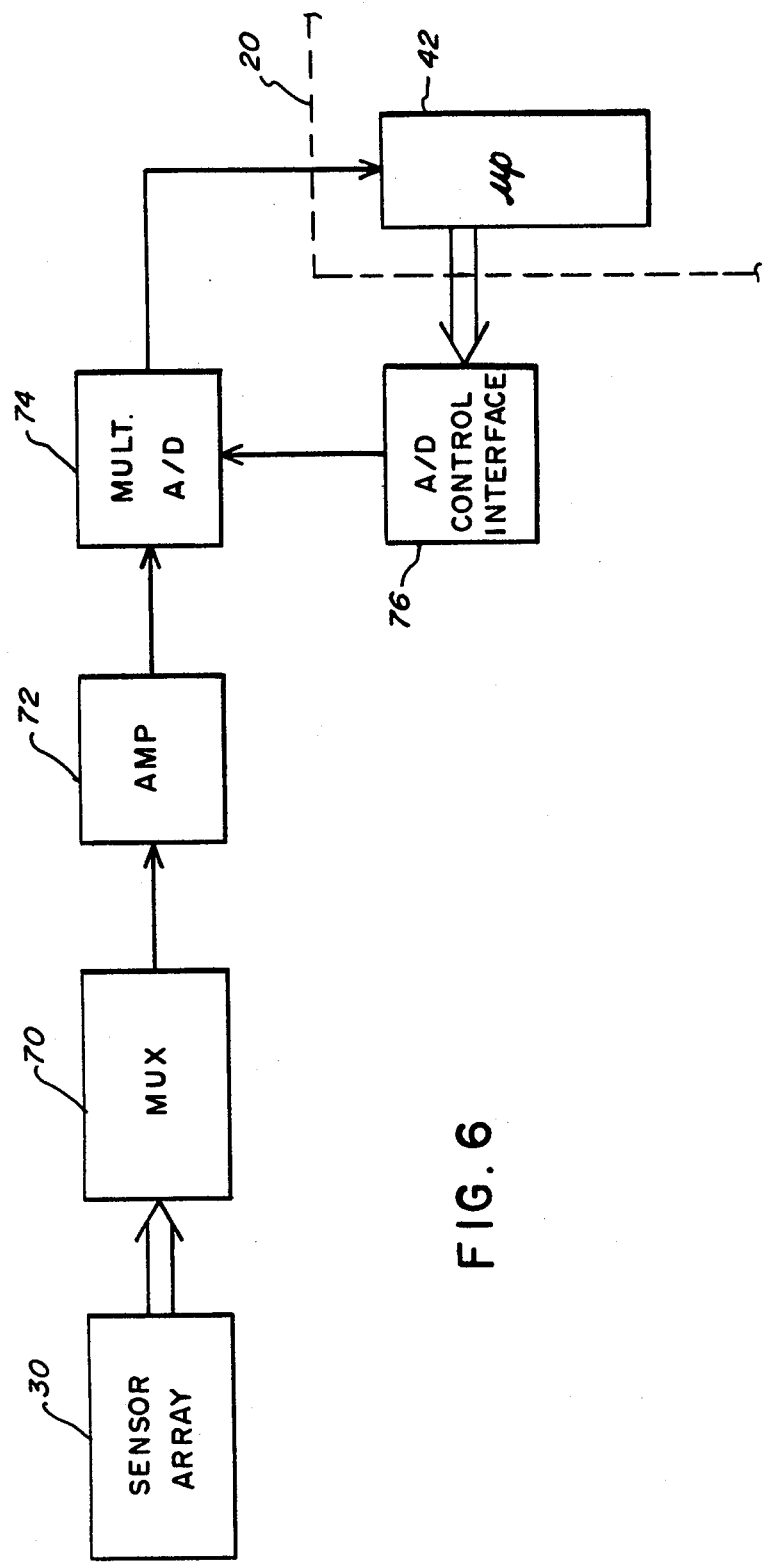

FIGS. 5 and 6 illustrate alternative embodiments of the present invention in which corrections to the output signals are made under microprocessor control in the signal processing circuitry. In FIG. 5, signals from array 30 are multiplexed by multiplexer 60, amplified by gain-controlled amplifier 62, converted to digital signals by A/D converter 64, and supplied to microprocessor 42 of exposure control 20. During the calibration procedure, microprocessor 42 calculates the gain corrections required for each sensor and stores the gain calibration values in gain control interface 66. Under normal operation, as each signal is supplied to microprocessor 42, gain control interface 66 adjusts the gain of gain-controlled amplifier 62 in accordance with the appropriate stored gain calibration value.

In FIG. 6, signals from array 30 are multiplexed by multiplexer 70, amplified by amplifier 72, converted to digital signals by multiplying A/D converter 74, and supplied to microprocessor 42 of exposure control 20. Microprocessor 42 provides calibration values to A/D control interface 76, which stores the calibration values for use during normal operation. As each signal is supplied to microprocessor 42 during normal operation, A/D control interface 76 provides correction signals to multiplying A/D converter 74 to cause multiplying A/D converter 74 to internally adjust the digital output signals to microprocessor 42.

In conclusion, the present invention provides a simple yet effective method of calibrating the output signals from light sensors in a photographic printer system. The automatic calibration assures that factors unrelated to the scene contained on the photographic film will not erroneously affect the printing exposure times. The present invention avoids requiring the operator to perform time-consuming and expensive electrical adjustments to calibrate sensors, and rather takes full advantage of the computational power of the digital processor which is also used to control exposures.

Although the present invention has been described with reference to preferred embodiments, workers skilled in the art will recognize that changes may be made in form and detail without departing from the spirit and scope of the invention.

What is claimed is:

1. In a photographic printer system having a first location along a path of advancement of a photographic film original at which light is passed through the photographic film original to expose a photosensitive medium, the improvement comprising:

light source means for providing light to the photographic film original at a second location upstream of the first location along the path of advancement of the photographic film original;

a plurality of light sensors positioned at the second location for providing output signals indicative of light received from defined areas of the photographic film original;

calibration value means for calculating digital calibration values for each of the plurality of light sensors based upon values of the output signals under a reference condition in which a filter of essentially uniform attenuation is placed in the path of the light from the light source means to the plurality of light sensors;

digital storing means for storing the plurality of digital calibration values;

correcting means for correcting the output signals from the plurality of light sensors during normal operation of the printer system based upon the stored plurality of digital calibration values; and exposure control means for controlling exposures of the photosensitive medium as a function of the corrected output signals during normal operation of the printer system.

2. The invention of claim 1 wherein the filter of essentially uniform attenuation is unexposed, processed photographic film.

3. A method of controlling a photographic printer having a light sensor array for providing a plurality of output signals indicative of light sensed by the light sensor array from defined areas of a photographic film, and having a source of light for providing light along the light path to the light sensor array, the light sensor array and the source of light being positioned upstream of a location at which light is passed through photographic film to expose a photosensitive medium, the method comprising:

interposing a filter of essentially uniform attenuation in the path of light to the light sensor array to produce a reference condition;

deriving digital calibration values for each sensor of the array based upon the values of the output signals during the reference condition;

storing the digital calibration values;

advancing the photographic film during normal operation of the photographic printer to a position in the path of light to the light sensor array;

correcting the plurality of output signals provided by the light sensing array during normal operation of the photographic printer based upon the stored digital calibration values;

advancing the photographic film to a location at which light is passed through the photographic film to expose a photosensitive medium;

and controlling exposures of the photosensitive medium as a function of the corrected output signals.

4. The invention of claim 3 wherein the filter of essentially uniform attenuation is processed photographic film.

5. The invention of claim 4 wherein the filter of essentially uniform attenuation is unexposed, processed photographic film.

* * * * *